3,380,985
ALKALI-METAL-CONTAINING CATALYST AND POLYMERIZATION PROCESS EMPLOYING SAME
Marvin B. Edwards, Vernon K. Park, and Edward H. Carter, Jr., Longview, Tex., assignors to Eastman Kodak Company, Rochester, N.Y., a corporation of New Jersey
No Drawing. Filed July 22, 1964, Ser. No. 384,514
14 Claims. (Cl. 260—94.9)

This invention relates to the polymerization of hydrocarbons and catalysts useful for this purpose. More particularly, this invention relates to the catalytic polymerization of α-monoolefinic hydrocarbons to form solid, highly crystalline polymers. In a specific aspect, this invention relates to the polymerization of α-monoolefinic hydrocarbons using catalyst mixtures that are effective at high temperatures.

It is well known that α-olefinic hydrocarbons, such as ethylene and propylene, can be polymerized by contacting them with catalyst mixtures of transition metal compounds and organometallic compounds of Group I-III metals of the Periodic Table. When such catalyst mixtures are employed in the polymerization of α-olefinic hydrocarbons such as propylene, the polymers obtained are partially crystalline and partially amorphous. Since polymers having higher crystallinities exhibit improved physical properties, such as higher softening points, higher stiffness, etc. than the amorphous polymers, it is desirable to reduce the proportions of amorphous polymer obtained in a polymerization process.

It is evident, therefore, that the state of the art will be greatly enhanced by a catalytic polymerization process for the preparation of solid polymers which exhibit a high degree of crystallinity. Likewise, a noteworthy contribution to the art will be a catalyst that is effective to form such polymers.

Accordingly, an object of this invention is to provide a novel process for the polymerization of α-olefinic hydrocarbons to solid high molecular weight polymers and particularly to solid, high molecular weight polymers having improved crystallinities.

Another object of this invention is to provide a novel process for the polymerization of α-olefinic hydrocarbons which process employs a catalyst mixture which, unlike closely related mixtures, is very effective for polymerizing α-olefinic hydrocarbons to solid polymer having good physical properties.

Another object of this invention is to provide a process for the polymerization of α-olefinic hydrocarbons to highly crystalline polymers using a simple, direct and economic process.

Another object of this invention is to polymerize α-olefinic hydrocarbons employing a catalyst which produces a more crystalline polymer of higher molecular weight for a given reaction temperature than prior art catalysts available heretofore.

Another object of this invention is to provide a polymerization process which employs a catalyst that is insoluble in the reaction medium and which can be removed from the polymerizate in a simple manner using mechanical means such as filtration.

Still another object of this invention is to provide a novel catalyst which can be employed for the high temperature polymerization of α-olefinic hydrocarbons to solid, high molecular weight, highly crystalline polymers.

Other objects will be apparent from the description and claims which follow.

In accordance with the invention, it has been found that α-olefinic hydrocarbons can be polymerized to solid, high molecular weight polymer of high crystallinity in the presence of a catalyst comprising (1) an alkali metal dialuminum heptahydride and (2) a halide of a metal from Group IV–B—VI–B of the Periodic Table, the valence of the metal in said halide being at least one less than maximum.

The novel process of this invention is extremely effective for polymerizing α-olefinic hydrocarbons, particularly the straight and branched chain aliphatic or aromatic α-monoolefinic hydrocarbons containing 2–12 carbon atoms to form solid, high molecular weight, highly crystalline polymer in excellent yield. The polymerizable α-olefinic hydrocarbons suitable for use in the practice of this invention include ethylene, propylene, butene-1, heptene-1, decene-1, 3-methyl-1-butene, 4-methyl-1-butene, 4-methyl-1-hexene, 5-methyl-1-hexene, 4,4-dimethyl-1-butene, styrene, α-methylstyrene, allylcyclohexane, allylcyclobutane, allylbenzene and the like. In carrying out the process, the α-olefinic hydrocarbons can be polymerized alone, in admixture or in sequence with each other or with other polymerizable hydrocarbons.

A significant feature of this invention is that the catalyst mixture employed in the process gives a polymer having high crystallinity at high temperatures. In contrast, many of the prior art aluminum containing catalysts, for example, aluminum trialkyl-titanium trichloride catalysts, give polymers of low crystallinity at high temperatures. Furthermore, at temperatures substantially in excess of 100° C. such prior art catalysts become substantially ineffective.

The catalyst employed in the practice of this invention also produce a more crystalline polymer of higher molecular weight for a given reaction temperature in comparison to many prior art catalysts. This is a significant economic advantage since it allows a higher polymerization rate at a higher temperature to produce polymer of suitable molecular weight with increased space-time yields. In addition, alkali metal dialuminum heptahydrides can be used at concentrations that are one-third to one-fourth those of catalyst components ordinarily employed with transition element halides in polymerization reactions and, at these lower concentrations, there is obtained a polymer having improved crystallinity and higher molecular weight. This is, of course, a significant cost advantage in commercial operations.

As already indicated, one component of the catalyst employed in the process of this invention is an alkali metal dialuminum heptahydride. This compound has the formula $MAl_2H_7$, where M is an alkali metal such as lithium, sodium or potassium and can be prepared by reacting a finely divided alkali metal hydride with a dialkyl aluminum hydride in an inert organic solvent such as hexane, heptane, cyclohexane, mineral spirits, benzene or toluene. The dialkyl aluminum hydrates employed in their preparation have the formula $R_2AlH$, where R is an alkyl group. The alkyl groups in the alkyl aluminum hydrides can be straight or branched chain and will generally contain up to about 20 carbon atoms, although those containing 1–12, or more preferably, 1–4 carbon atoms, are most often employed. Suitable alkyl groups, therefore, include, methyl, ethyl, propyl, isobutyl, hexyl, heptyl, decyl, dodecyl, tetradecyl, eicosyl and the like.

The alkali metal hydride and dialkyl aluminum hydride are reacted at a temperature in the range of about 25° to about 150° C., preferably about 100° to about 110° C. for a period varying from about 1 to about 96 hours, preferably from about 12 to about 48 hours to form the alkali metal dialuminum heptahydride. The reaction mixture is generally stirred to facilitate complete reaction, as shown by the absence of any organic group in the product. The product can be simply filtered from the solution to remove unreacted alkali metal hydride and the clear filtrate cooled to 25° C., whereupon the alkali metal dialuminum heptahydride precipitates. The precipitated crystals can be collected by filtration and washed with pure inert solvent. However, the crystals need not be removed from the reaction mixture since the reaction mixture is an effective catalyst component. The ratio of alkali metal hydride to dialkyl aluminum hydride employed in the reaction can vary from 0.1:1 to about 10:1 with preferred mole ratios being less than equimolar with respect to the alkali metal hydride.

The alkali metal dialuminum heptahydrides or reaction mixtures containing them are combined with at least one subvalent halide of a transition metal from Groups IV–B—VI–B of the Periodic Table to form the active catalyst. The Periodic Table referred to herein can be found in "Lange's Handbook of Chemistry," 8th edition (1959) published by Handbook Publishers, Inc., at pages 56 and 57.

The transition metals included in Groups IV–B, V–B and VI–B of the Periodic Table are exemplified by titanium, zirconium, vanadium, molybdenum, chromium and the like. The preferred Groups IV–B—VI–B transition metals are those having molecular weights in the range of about 47 to about 52, i.e., titanium, vanaduim or chromium. The metals in these metal polyhalides exhibit a valence which is at least one less than maximum. It is preferred that the titanium halides such as titanium trichloride, or tribromide be employed in the practice of this invention. These metal halides can be prepared by any suitable method. Thus, titanium trichloride, for example, can be prepared by reducing titanium tetrachloride with hydrogen, alkali metals or other metals such as aluminum, titanium, antimony and the like. Transtion metal halides other than titanium halides which give good results include, for example, vanadium trichloride, vanadium dichloride, molybdenum dichloride, tungsten dibromide. zirconium trichloride, chromium dichloride and the like. The catalyst components are generally employed in mole ratios of the alkali metal dialuminum heptahydride, based on aluminum content, to transition metal subhalide in the range of about 0.1:1 to about 10:1; with preferred mole ratios being in the range of about .25:1 to about 6:1.

The components referred to hereinabove make up the effective catalyst for the process. However, the stereospecificity of the catalyst can be improved by employing another component which, by itself, is not an effective catalyst for the reaction. These additional components often lead to the preparation of polymers of higher molecular weight and crystallinity for a given polymerization temperature and it is advantageous to employ them in practicing this invention. Such additional components include the Group I metal halides, particularly the alkali metal fluorides such as sodium or potassium fluoride, and oxides of Group II metals of the Periodic Table, as exemplified by magnesium oxide, barium oxide, calcium oxide and the like. The fluorides are the preferred alkali metal halides but the chlorides or iodides are suitable. These additional catalyst components are usually employed in mole ratios in the range of about 0.1:10, and preferably 0.25:5 based on the transition metal subhalide.

The polymerization in accordance with this invention is generally carried out at pressures in the range of about atmospheric to about 2,000 atmospheres. Usually pressures of at least 15 atmospheres are employed, the preferred pressures being in the range of about 15 to about 300 atmospheres are employed to obtain commercialy satisfactory rates. Higher pressures are generally required for the polymerization in the absence of a solvent. In the absence of a solvent, the gas dissolved in the polymer should generally be from 1 to 4 times the weight of the polymer in order to obtain viscosities that can be handled satisfactorily in the reactor space. Increasing the quantities of dissolved gas lowers the viscosity of the mixture in the reactor space which allows for better heat transfer and good catalyst distribution. The pressure in the polymerization can be achieved in any desirable manner, a convenient method being to pressure the system with the monomer or monomers being polymerized.

The polymerization reaction can be carried out in the presence or absence of an inert organic liquid vehicle. When the polymerization is carried out in the presence of an inert organic liquid vehicle, this vehicle can be any of the inert organic liquids which contain no combined oxygen and which are free of water, alcohol, ether or other compounds containing oxygen or compounds containing unsaturation. The organic vehicle employed can be an aliphatic alkane or cycloalkane such as pentane, hexane, heptane or cyclohexane, or a high molecular weight liquid paraffin or mixture of paraffins which are liquid at the reaction temperature or an aromatic hydrocarbon such as benzene, toluene, xylene or the like, or a halogenated aromatic compound such as chlorobenzene. A petroleum fraction of suitable boiling range such as odorless mineral spirits (a sulfuric acid washed paraffinic hydrocarbon boiling at about 180–200° C.) will give particularly good results. In addition, good results can be obtained when the polymerization is carried out in the presence of a dense gas such as highly compressed propylene by operating at elevated pressures.

The catalyst mixtures of this invention are extremely effective over a wide temperature range. Thus, the polymerization reaction can be carried out at a temperature in the range of about 150° C. to about 200° C. At these temperatures the catalyst is employed in concentrations of about 0.01 to about 5%, by weight, based on the monomer being polymerized, with preferred catalyst concentrations being in the range of about 0.1 to about 1%, by weight. Lower catalyst concentrations can be employed, but generally the rate of polymer formation is quite slow and at higher catalyst concentrations considerable difficulty is encountered in controlling the reaction. The concentration of the catalyst employed will generally depend upon the desired method of operation, for example, low catalyst concentrations would be used where high polymer to catalyst yields are desired. On the other hand, high catalyst concentrations are employed where high polymer yields per unit of reactor space are desired.

The process of this invention makes it possible to prepare a highly crystalline polymer, i.e., one exhibiting a crystallinity in excess of 70, 80 or even 90%. The crystallinity of the product can be determined by extraction, X-ray diffraction techniques or any other method known to be useful for this purpose. For example, the crystallinity of polypropylene can be determined by refluxing the polymer in hexane, the portion of the solid polymer insoluble in refluxing hexane being the crystalline portion.

This invention can be further illustrated by the following examples of preferred embodiments thereof although it will be understood that these example are included merely for purposes of illustration and are not intended to limit the scope of the invention unless otherwise specifically indicated.

EXAMPLE 1

As already indicated, the alkali metal dialuminum heptahydrides formed by the reaction of an alkali metal hydride and a dialkyl aluminum hydride, under the conditions disclosed herein, is one component of an active catalyst for polymerizing α-olefinic hydrocarbons to solid high molecular weight crystalline polymers. To illustrate, $LiAl_2H_7$ is prepared by placing 403 ml. of a 25 weight percent (0.5 mole) solution of diisobutyl aluminum hydride in normal heptane and 4.76 g. (0.6 mole) of lithium hydride in a 1,000 ml. round bottom, 3-neck flask. The mixture is stirred for 12 hours at 110° C. under nitrogen and filtered while hot through a sintered glass disk. Fine white needles precipitate after cooling the clear filtrate.

The slurry is filtered through a sintered glass disk and the resulting crystalline compound is washed with normal heptane. After being washed the crystalline compound is reslurried in n-heptane. The melting point of the $LiAl_2H_7$ is 153–154° C. with decomposition, but in hydrocarbon solvent it is stable at 200° C.

*Analysis.*—Actual:[1] Weight percent aluminum, 80.2; weight percent lithium, 9.9; weight percent hydrogen, 10.0. Calculated: weight percent aluminum, 79.4; weight percent lithium, 10.3; weight percent hydrogen, 10.3.

20 ml. of n-heptane containing 0.17 g. ($2.5 \times 10^{-3}$ mole) of $LiTl_2H_7$, prepared according to the above procedure, 1.5 g. ($1.0 \times 10^{-2}$ mole) of titanium trichloride and 1,000 ml. of mineral spirits are added to a 2-liter stirred autoclave heated to 150° C. and pressured to 800 p.s.i. with propylene. An immediate polymerization reaction occurs, as shown by a drop in pressure and a temperature elevation. The autoclave is pressured to 1,000 p.s.i. with propylene and the reaction is allowed to continue for 2 hours at 150° C. The polymer solution is removed from the autoclave and cooled. The catalyst and solvent are removed from the polymer and the yield of solid polypropylene is 150 g. The polypropylene has an inherent viscosity in tetralin at 145° C. of 1.83 and 72 percent, by weight, is insoluble in boiling n-hexane.

EXAMPLE 2

13 ml. (0.112 g. of $1.6 \times 10^{-3}$ moles) of $LiAl_2H_7$ in heptane and 1 g. ($6.7 \times 10^{-3}$ moles) of titanium trichloride are charged with 500 ml. of mineral spirits to a 2-liter stirred autoclave pressured to 300 p.s.i. with propylene at 70° C. A highly exothermic reaction occurs with a rise in temperature and the reaction is continued for 2 hours. At the end of this time there is obtained 308 g. of polypropylene having an inherent viscosity in tetralin at 145° C. of 2.6 and a hexane non-extractable content of 83%, by weight.

EXAMPLE 3

Sodium hydride is reacted with diisobutyl aluminum hydride employing the procedure of Example 1 to obtain sodium dialuminum heptahydride having the formula $NaAl_2H_7$. A portion of the resulting slurry containing $NaAl_2H_7$ is used as one component of the catalyst in carrying out the process of this invention. An aliquot containing 0.55 g. ($6.5 \times 10^{-3}$ moles) of $NaAl_2H_7$ and 2.0 g. ($1.3 \times 10^{-2}$ moles) of titanium trichloride are charged with 900 ml. of xylene to a 2-liter stirred autoclave heated to 155° C. and pressured to 1,000 p.s.i. with ethylene. The polymerization proceeds for 4 hours. The polymer solution is extruded from the autoclave, washed with isopropanol and acetone and dried. The yield is 330 g. of crystalline polyethylene having a melt index of 0.1 and a density of 0.9665.

EXAMPLE 4

The use of sodium containing compounds with transition metal halides as catalysts for the polymerization of α-olefinic hydrocarbons containing 3 or more carbon atoms generally results in the preparation of an oily or liquid polymer. In contrast, the sodium dialuminum heptahydride-transition metal halide mixtures of this invention can be used to obtain solid polymer of relatively high molecular weight and crystallinity. To illustrate, a catalyst comprising 0.55 g. ($6.5 \times 10^{-3}$ moles) of $NaAl_2H_7$, 2.0 g. ($1.3 \times 10^{-2}$ moles) of titanium trichloride and 1,000 ml. of cyclohexane is charged to a 2-liter stirred autoclave heated to 150° C. and pressured to 800 p.s.i. with propylene. The reaction proceeds for 4 hours and polymer solution is removed from the autoclave, washed with isopropanol and acetone and dried. There is obtained 65 g. of solid polypropylene having an inherent viscosity in tetralin at 145° C. of 0.9 and a hexane non-extractable content of 45%, by weight.

[1] Mole ratio Li to Al to H=0.96 :2.02 :6.8.

EXAMPLE 5

Diisobutyl aluminum hydride is the preferred dialkyl aluminum hydride employed in the preparation of the alkali metal dialuminum heptahydride employed as one component of the catalyst of this invention. However, any of the dialkyl aluminum hydrides can be employed for this purpose. To illustrate, 2.4 g. of finely divided lithium hydride and 38 ml. of a 25% solution of diethyl aluminum hydride (6 g.) is added in a nitrogen charged dry box to a 500 ml. 3-neck flask fitted with a stirrer and thermowell. The mixture is stirred under a nitrogen atmosphere for 24 hours at 90° C. After cooling to room temperature the $LiAl_2H_7$ is separated from the slurry by filtration and reslurried in n-heptane. An aliquot of the slurry containing 0.228 ($3.2 \times 10^{-3}$ moles) of $LiAl_2H_7$ is combined with 2.0 g. ($1.3 \times 10^{-2}$ moles) of vanadium trichloride and 1,000 ml. of xylene and charged to a 2-liter stirred autoclave heated to 150° C. and pressured to 1,000 p.s.i. with propylene. After a reaction period of 2 hours, 200 ml. of isobutanol is charged to the autoclave and stirred for 15 minutes. The polymer solution is extruded, washed with isopropanol and acetone and dried. The yield is 280 g. of white solid crystalline polypropylene having an inherent viscosity in tetralin at 145° C. of 2.2 and a crystallinity of 78%.

Titanium trichloride is the preferred transition element sub-halide employed in the catalyst mixture of this invention. However, as shown by the above example, vanadium trichloride can be used as the transition element halide component of the catalyst to give excellent results. Similarly, good results are obtained when other transition metal subhalides are substituted in the above procedure for vanadium trichloride. Examples of such transition element subhalides are vanadium dichloride, molybdenum dichloride, tungsten dibromide, zirconium trichloride, chromium dichloride, and the like.

EXAMPLE 6

A catalyst comprising 3.6 g. of lithium dialuminum heptahydride and 50 g. of titanium trichloride is charged to an 80-gallon stirred autoclave containing 40 gallons of mineral spirits and pressured to 40 p.s.i. at 140° C. with a 50–50 (v./v.) mixture of propylene and butene-1. The polymerization is run at 140° C. At the end of 12 hours the 20% polymer solution in mineral spirits is discharged from the reactor and filtered. The polymer solution is concentrated and molten polymer containing 15% residual solvent is extruded into water and chopped into pellets. The pellets are extracted with n-hexane at 25° C. for 12 hours and 25% low molecular weight amorphous copolymer is removed. The yield is 65 pounds of propylene butene-1 copolymer (percent butene-1 by infrared analysis, 48%) having an inherent viscosity in tetralin at 145° C. of 1.3.

Similar results are obtained when $KAl_2H_7$ or $NaAl_2H_7$ is used in place of $LiAl_2H_7$ in the above procedure.

EXAMPLE 7

The catalyst employed in the process of this invention can contain additional components such as Group I metal halides or oxides of Group II metals of the Periodic Table. These additional components are not themselves polymerization catalysts but they will improve molecular weight and crystallinity of the polymer. To illustrate, Example 6 is repeated except that 2.7 g. of sodium fluoride is added to the catalyst to give a mole ratio of $LiAl_2H_7:TiCl_3:NaF$ of 0.16:1:0.2. The yield is 60 pounds of propylene butene-1 copolymer containing 45% butene and having an inherent viscosity in tetralin at 145° C. of 1.55. The amount of low molecular weight amorphous copolymer removed by hexane extraction is 18%, as compared to the 25% removed in Example 6.

EXAMPLE 8

As previously stated, the complete reaction product of the lithium hydride and the dialkyl aluminum hydride can be employed as one component of the catalyst of this invention. To illustrate, a catalyst mixture is formed by adding 73.8 g. of diisobutyl aluminum hydride to 4.2 g. of finely divided lithium hydride in 300 ml. hexane. The mixture is heated at 110° C. for 10 hours, cooled to 25° C. and charged with 80 g. of titanium trichloride and 20 gal. of mineral spirits to an 80 gal. stirred reactor containing butene-1 at 400 p.s.i. and 130° C. At the end of 12 hours the polymer solution is filtered, concentrated, extruded and chopped into pellets. The yield is 105 lbs. of solid polybutene-1 having an inherent viscosity in tetralin at 145° C. of 1.2.

EXAMPLE 9

The alkali metal hydride and the dialkyl aluminum hydride must be reacted as disclosed herein to form an alkali metal dialuminum heptahydride which is an effective catalyst component to obtain highly crystalline, high molecular weight polymer from $\alpha$-monoolefinic hydrocarbons. To illustrate, a mixture of lithium hydride, diisobutyl aluminum hydride and titanium trichloride is employed to polymerize propylene. For comparison, additional runs are made using the catalyst of this invention. The catalyst is charged with 950 ml. of mineral spirits to a 2-liter stirred autoclave pressured with propylene to 1,000 p.s.i. at 150° C. The results are as follows:

TABLE

| Run | Moles LiH | Moles Diisobutyl Aluminum Hydride | Treatment | Moles TiCl₃ | Yield of Polypropylene, Grams | Crystallinity* | Inherent Viscosity in Tetralin at 145° C. |
|---|---|---|---|---|---|---|---|
| 1 | .01 | .01 | Stirred 4 hrs. at 110–115° C | .01 | 206 | 70.8 | 1.74 |
| 2 | .01 | .01 | Stirred 24 hrs. at 110–115° C | .01 | 199 | 71.5 | 1.83 |
| 3 | .005 | .01 | Stirred 11 hrs. at 110–115° C | .01 | 187 | 72.2 | 1.86 |
| 4 | .01 | .01 | None | .01 | 95 | 60.0 | 0.95 |

*Percent, by weight, of polymer non-extracted with boiling n-hexane in Soxhlet extractor (6 hrs.).

It can be seen from the above Table that the unreacted lithium hydride and diisobutyl aluminum hydride containing mixture gives a polymer of much lower molecular weight and crystallinity in comparison to the reaction product of the two. It is also significant to note that the catalyst of this invention gives a substantial improvement in yield.

Thus, by the practice of this invention there is provided to the art a novel catalyst mixture which can be employed to form solid high molecular weight crystalline polymer from $\alpha$-olefinic hydrocarbons. The polymers that are obtained in accordance with the practice of this invention can be used for forming film, molded articles, coated articles and the like, which products exhibit good physical properties. They can be blended with other plastic materials or compounded with pigments, dyes, fillers, stabilizers and the like. The process of this invention is applicable to forming copolymers, both random and block, from $\alpha$-olefins containing 2–12 carbon atoms and a variety of products can be obtained by varying the relative proportions of the components of the mixtures of monomers being polymerized.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A polymerization process which comprises contacting an $\alpha$-olefinic hydrocarbon, at a temperature in the range of about 0 to about 200° C. and a pressure in the range of about atmospheric to about 2,000 atmospheres, with a catalyst comprising (1) an alkali metal dialuminum heptahydride and (2) a halide of a metal from Groups IV–B—VI–B of the Periodic Table, the valence of the metal in said halide being at least one less than maximum, the mole ratio of (1), based on aluminum content, to (2) being in the range of about 0.1:1 to about 10:1.

2. A polymerization process which comprises contacting an $\alpha$-olefinic hydrocarbon containing 2–12 carbon atoms, at a temperature in the range of about 150 to about 200° C. and a pressure in the range of about 15 atmospheres to about 2,000 atmospheres, with a catalyst comprising (1) an alkali metal dialuminum heptahydride and (2) a halide of a metal from Groups IV–B—VI–B of the Periodic Table, the valence of the metal in said halide being at least one less than maximum, the mole ratio of (1), based on aluminum content, to (2) being in the range of about .25:1 to about 6:1.

3. A polymerization process which comprises contacting an $\alpha$-olefinic hydrocarbon containing 2–12 carbon atoms, at a temperature in the range of about 150° to about 200° C. and a pressure in the range of about 15 atmospheres to about 200 atmospheres, with a catalyst comprising (1) lithium dialuminum heptahydride and (2) a halide of a metal from Groups IV–B—VI–B of the Periodic Table, the valence of the metal in said halide being at least one less than maximum, the mole ratio of (1), based on aluminum content, to (2) being in the range of about 0.1:1 to about 10:1.

4. A polymerization process which comprises contacting an $\alpha$-olefinic hydrocarbon containing 2–12 carbon atoms at a temperature in the range of about 150° to about 200° C. and a pressure in the range of about 15 atmospheres to about 200 atmospheres, with a catalyst comprising (1) lithium dialuminum heptahydride and (2) a halide of a metal from Groups IV–B—VI–B of the Periodic Table, the valence of the metal in said halide being at least one less than maximum and (3) an alkali metal halide, the mole ratio of (1), based on aluminum content, to (2) being in the range of about 0.1:1 to about 10:1 and the mole ratio of (3) to (2) being in the range of about .1:10 to about 0.25:5.

5. A polymerization process which comprises contacting an $\alpha$-olefinic hydrocarbon containing 2–12 carbon atoms at a temperature in the range of about 150° to about 200° C. and a pressure in the range of about 15 atmospheres to about 200 atmospheres, with a catalyst comprising (1) lithium dialuminum heptahydride, (2) a halide of a metal from Groups IV–B—VI–B of the Periodic Table, the valence of the metal in said halide being at least one less than maximum, and (3) an oxide of a metal from Group II of the Periodic Table, the mole ratio of (1), based on aluminum content, to (2) being in the range of about 0.1:1 to about 10:1 and the mole ratio of (3) to (2) being in the range of about .1:10 to about 0.25:5.

6. A polymerization process which comprises contacting propylene, at a temperature in the range of about 150° to about 200° C. and a pressure in the range of about 15 to about 200 atmospheres, with a catalyst comprising (1) lithium dialuminum hydride and (2) titanium trichloride, the mole ratio of (1), based on aluminum content, to (2) being in the range of about 0.1:1 to about 10:1.

7. The polymerization process which comprises contacting propylene, at a temperature of about 150° C. and a pressure of about 1,000 p.s.i., with a catalyst comprising (1) lithium dialuminum heptahydride and (2) titanium trichloride, the mole ratio of (1), based on aluminum content, to (2) being in the range of about 1:1 to about 1:2.

8. A polymerization process which comprises contacting ethylene, at a temperature of about 155° C. and a pressure of about 1,000 p.s.i., with a catalyst comprising (1) sodium dialuminum heptahydride and (2) titanium trichloride, the mole ratio of (1), based on aluminum content, to (2) being about 6:1.

9. A polymerization process which comprises contacting a mixture of propylene and butene, at a temperature of about 140° C. and a pressure of about 40 p.s.i., with a catalyst comprising (1) lithium dialuminum heptahydride, (2) titanium trichloride and (3) sodium fluoride, in the mole ratio of (1), based on aluminum content, to (2) to (3) being about 0.16:1:0.2.

10. A catalyst for the polymerization of α-monoolefinic hydrocarbons to high molecular weight crystalline polymers comprising (1) an alkali metal dialuminum heptahydride and (2) a halide of a metal from Groups IV–B—VI–B of the Periodic Table, the valence of the metal in said halide being at least one less than maximum, the mole ratio of (1), based on aluminum content, to (2) being in the range of about 0.1:1 to about 10:1.

11. A catalyst for the polymerization of α-monoolefinic hydrocarbons to high molecular weight crystalline polymers comprising (1) an alkali metal dialuminum heptahydride and (2) a halide of a metal from Groups IV–B—VI–B of the Periodic Table, the valence of the metal in said halide being at least one less than maximum, the mole ratio of (1), based on aluminum content, to (2) being in the range of about .25:1 to about 6:1.

12. A catalyst for the polymerization of α-monoolefinic hydrocarbons to high molecular weight crystalline polymers comprising (1) lithium dialuminum heptahydride and (2) a halide of a metal from Groups IV–B—VI–B of the Periodic Table, the valence of the metal in said halide being at least one less than maximum and (3) an alkali metal halide, the mole ratio of (1), based on aluminum content, to (2) being in the range of about 0.1:1 to about 10:1 and the mole ratio of (3) to (2) being in the range of about .1:10 to about 0.25:5.

13. A catalyst for the polymerization of α-monoolefinic hydrocarbons to high molecular weight crystalline polymers comprising (1) lithium dialuminum heptahydride, (2) a halide of a metal from Groups IV–B—VI–B of the Periodic Table, the valence of the metal in said halide being at least one less than maximum, and (3) an oxide of a metal from Group II of the Periodic Table, the mole ratio of (1), based on aluminum content, to (2) being in the range of about 0.1:1 to about 10:1 and the mole ratio of (3) to (2) being in the range of about .1:10 to about 0.25:5.

14. A catalyst for the polymerization of α-monoolefinic hydrocarbons to high molecular weight crystalline polymers comprising (1) lithium dialuminum hydride and (2) titanium trichloride, the mole ratio of (1), based on aluminum content, to (2) being in the range of about 0.1:1 to about 10:1.

References Cited

UNITED STATES PATENTS

| | | | |
|---|---|---|---|
| 2,905,645 | 9/1959 | Anderson | 260—94.9 |
| 3,107,236 | 10/1963 | Thompson | 260—94.9 |
| 3,189,584 | 6/1965 | Shearer | 260—88.2 |

JOSEPH L. SCHOFER, *Primary Examiner.*

F. L. DENSON, M. B. KURTZMAN,
*Assistant Examiners.*